No. 648,217.  
A. PERTHOLD.  
BOTTLE WASHING MACHINE.  
(Application filed Oct. 4, 1899.)  
Patented Apr. 24, 1900.
(No Model.)  
3 Sheets—Sheet 1.
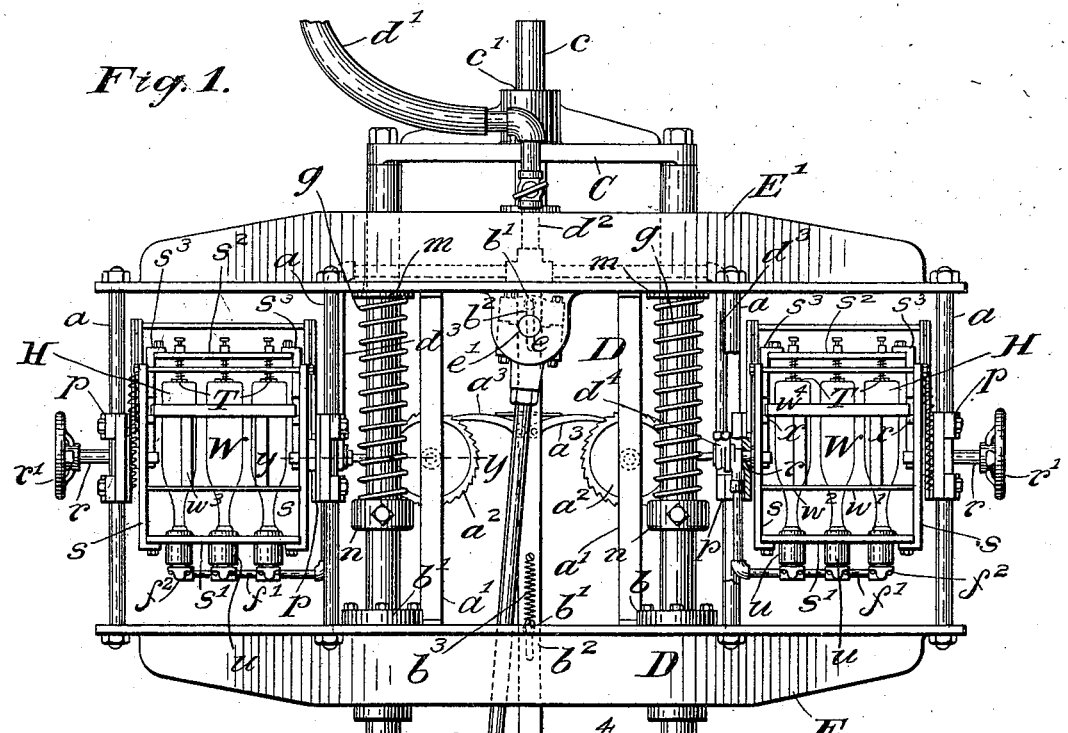
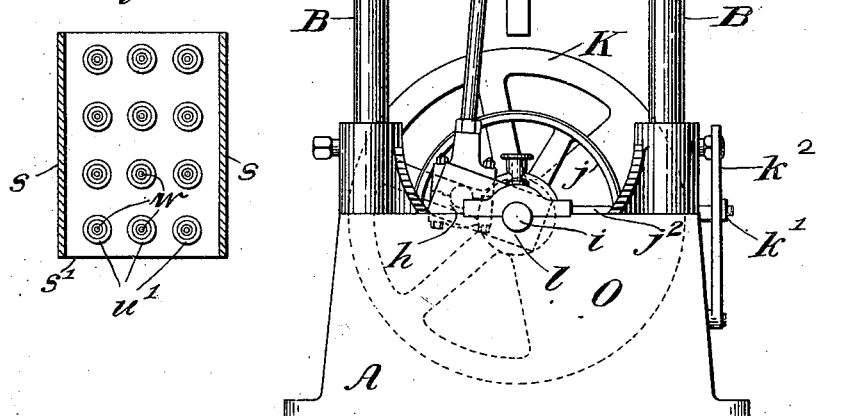
WITNESSES:
INVENTOR  
Andrew Perthold  
BY  
James A. Whitney  
ATTORNEY No. 648,217. Patented Apr. 24, 1900.
A. PERTHOLD.
BOTTLE WASHING MACHINE.
(Application filed Oct. 4, 1899.)
(No Model.) 3 Sheets—Sheet 2.
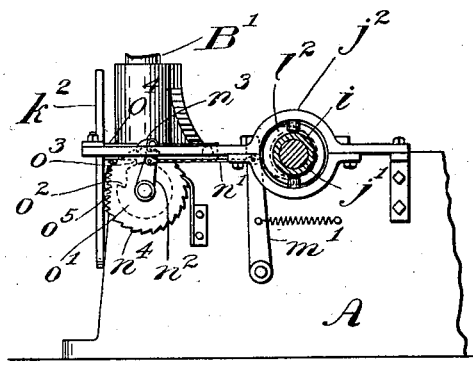
Fig. 4.
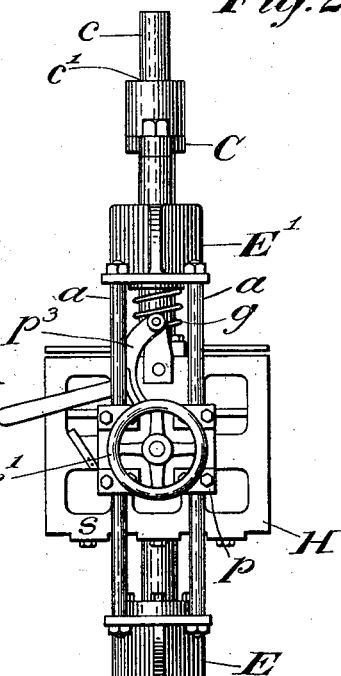
Fig. 2.
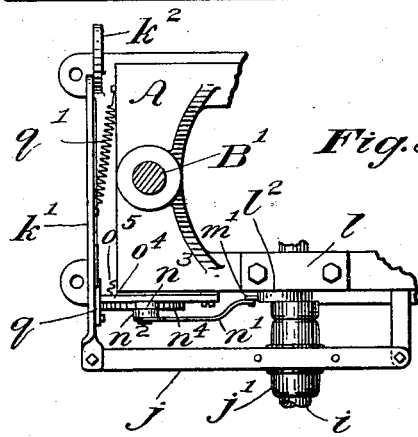
Fig. 3.
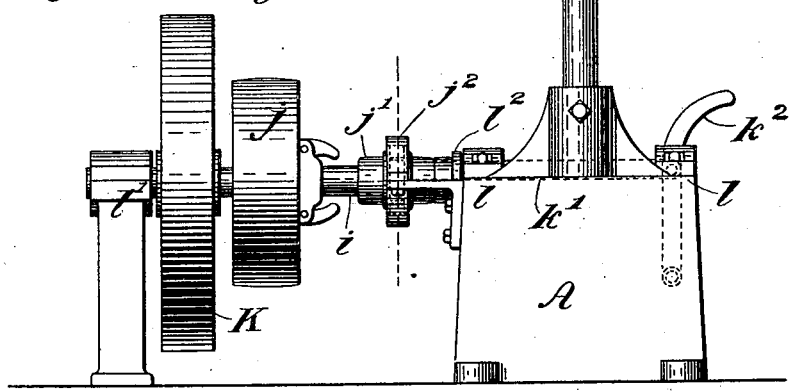
WITNESSES:
Amapah Whitney
Daniel S. Dexter
INVENTOR
Andrew Perthold
BY
James A. Whitney
ATTORNEY
THE NORRIS PETERS CO., PHOTO-LITHO., WASHINGTON, D. C.

No. 648,217. Patented Apr. 24, 1900.
A. PERTHOLD.
BOTTLE WASHING MACHINE.
(Application filed Oct. 4, 1899.)
(No Model.) 3 Sheets—Sheet 3.

WITNESSES:
Amajiah Whitney
Daniel S. Delter

INVENTOR
Andrew Perthold
BY
James A. Whitney
ATTORNEY

THE NORRIS PETERS CO., PHOTO-LITHO., WASHINGTON, D. C.

United States Patent Office.

ANDREW PERTHOLD, OF NEW YORK, N. Y.

BOTTLE-WASHING MACHINE.

SPECIFICATION forming part of Letters Patent No. 648,217, dated April 24, 1900.

Application filed October 4, 1899. Serial No. 732,486. (No model.)

*To all whom it may concern:*

Be it known that I, ANDREW PERTHOLD, a citizen of the United States, and a resident of the borough of Manhattan, in the city of New York, in the State of New York, have invented certain new and useful Improvements in Bottle-Washing Machines; and I do hereby declare that the following is a full, clear, and exact description of the same, reference being had to the accompanying drawings, making a part of this specification, in which—

Figure 5:
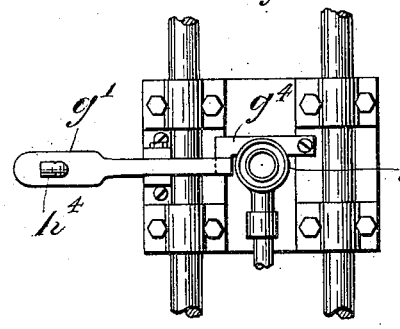
Figure 8:
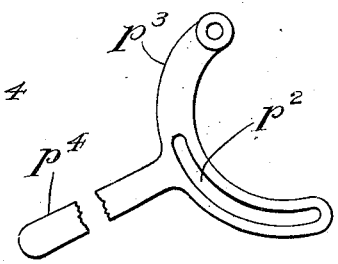
Figure 9:
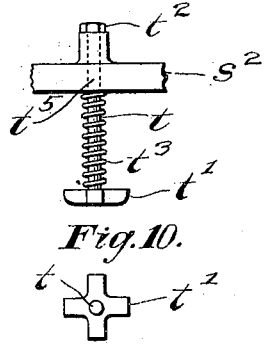
Figure 10:
Figure 6:
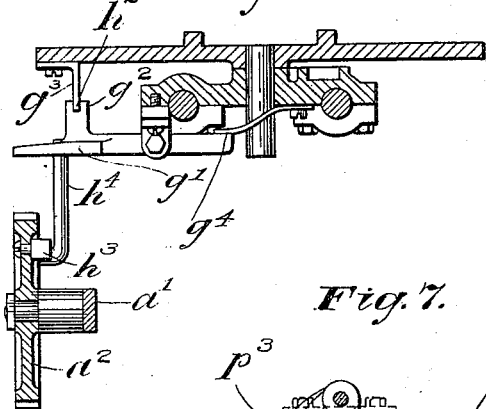
Figure 11:
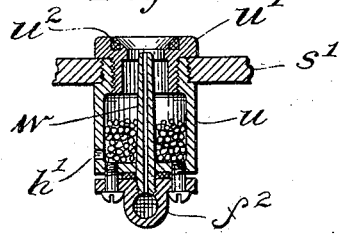
Figure 7:
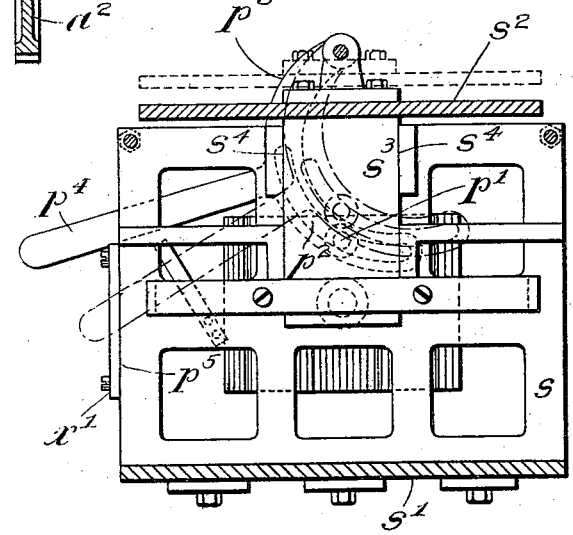
Figure 12:
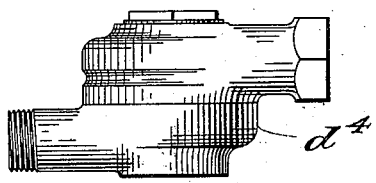
Figure 13:
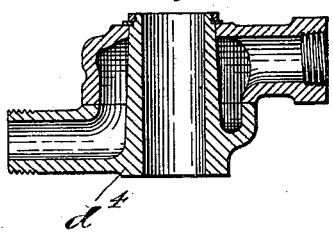

Figure 1 of the drawings is a front elevation of the entire machine. Fig. 2 is a side elevation. Fig. 3 is a plan view of a portion of the base of the machine with the timing mechanisms. Fig. 4 is an elevation, as seen from the rear, of parts shown in Fig. 3. Fig. 5 is a side elevation of a part of the bottle-holder frame seen from the interior. Fig. 6 is a sectional view on line $y\ y$ of Fig. 1 on the same scale as Fig. 5. Fig. 7 is a section through the bottle-crate. Fig. 8 is a detail of the cam shown dotted in Fig. 7. Fig. 9 is a side view of one of the bottle-holder fingers enlarged. Fig. 10 is a plan view of the finger. Fig. 11 is a sectional view, on an enlarged scale, of a shot-receptacle. Fig. 12 is a side view of one of the swing-joints. Fig. 13 is a longitudinal section of the swing-joint. Fig. 14 is a horizontal sectional view of a part of the apparatus.

A is the base of the machine. This base has upright columns B B', connected at their upper ends by a fixed yoke-piece C.

D is a sliding frame which consists, preferably, of two double-webbed beams E E', connected by rods $a\ a$. This yoke has stuffing-boxes $b\ b'$ of any usual or suitable construction and through which pass the columns B B'. The upper beam E' has at its central part a short column $c$, extending upward through the bearing C', which is of a construction similar to the other bearings $b$ and $b'$, provided in the yoke C. By the arrangement described provision is made for a vertically-reciprocating motion of the frame D, being guided in this motion by the stuffing-boxes $c'$, $b$, and $b'$, which have simply a running fit on the columns $c$, B, and B'.

The beam E' has two lugs $e$ side by side on its lower face. These lugs receive a wrist-pin $e'$, to which is attached a connecting-rod $f$, which is driven by a double crank $h$, formed on a shaft $i$. This latter has bearings $l\ l\ l'$ and is driven by a clutch-pulley $j$ by a belt of any suitable kind. Also mounted on the shaft $i$ is a fly-wheel K, which should be properly counterbalanced in any ordinary or suitable manner and the purpose of which is of course to secure steadiness in the motion of the machine.

On the columns B B' are collars $n\ n$, and on these collars rest spiral springs $g$. The frame D is cushioned on these springs, loose collars $m\ m$ being interposed. This is permitted, as the holes through the beam E' are of greater diameter than those of the columns in order to provide clearance.

As the frame D is reciprocated by the crank and connecting-rod the springs are alternately compressed and relaxed, the springs reducing jar and vibration in the parts to a minimum.

To the central portions of the rods $a\ a$ are bolted the brackets $p$, which carry pivots $r$. The outboard pivots carry the hand-wheels $r'$, which are used to turn the bottle-holders H, as presently herein set forth. Each bottle-holder H has sides $s$, bolted to the bottom $s'$, thus forming a channel-shaped frame.

The top or clamping portion of each bottle-holder is formed of a plate $s^2$, with slides $s^3$ bolted fast to it, so that the entire top, with bottle-holding fingers T T provided thereto, can be slid up and down in the ways $s^4$ of the side plates $s$. To afford the just-described movement of the top part, a cam-roll $p'$ is arranged to travel in the cam-slot $p^2$ of a cam $p^3$. When this latter is given an oscillating movement by means of a lever $p^4$, provided to the said cam, the cam is held by a catch $p^5$ in the position shown in dot-and-dash lines in the drawings, when it is desirable to hold the top raised for any length of time, as, per example, when putting in or taking out bottles.

The bottle-holding fingers T mentioned above are made with a shank $t$, a cross-shaped part $t'$ at the lower end, adapted to bear against the concave bottom of a bottle, and a nut or collar $t^2$ at the upper end. The shanks have their bearings in the holes $t^5$ of the top plate $s^2$, the spiral springs $t^3$ tending to force them down as they bear against the plate $s^2$ and the crosses $t'$. The lower plate $s'$ has screwed into it a number of cylindrical devices $u$, which form receptacles for shot and which have screwed to their upper ends internally-beveled bushings $u'$. These latter have seats $u^2$, made of rubber or other suitable soft or elastic material, so that they are adapted to receive the mouths of the bottles when the latter are placed on them in an inverted position.

The number of shot-receptacles must be the same as that of the fingers, and they must be directly under the fingers.

Through the bottom and extending up into the interior of the shot-cylinders are short nozzles $w$, through which in the use of the machine water for cleansing is forced, the water being conveyed to the nozzles through a hose $d'$, main pipe $d^2$, upper branch pipes $d^3$, (which latter carry the swing-joints $d^4$,) and the lower branch pipes $f'$, which connect with the nozzles by means of connections $f^2$, into which the nozzles $w$ are inserted and made fast, preferably by screw-threads.

The shot-cylinders $u$ have small holes $h'$ in their sides, through which the water can escape after having passed from the nozzles up into the bottles and performed the cleaning work, assisted by the shot.

What I have here termed "shot" are preferably small pieces of steel or iron with angular projections, so that they will scrape clean the insides of the bottles, but may comprise any similar material adapted to the purpose. They must be larger than the holes $h'$, so as not to escape with the waste water.

For convenience in placing the bottles in the holders bottle-racks W are used. Each of these racks consists of a thin plate $w'$, having circular holes $w^2$ to receive the necks of the bottles placed in the racks in an inverted position. To each of said plates upright strips $w^3$ are attached. These strips in their turn support a frame $w^4$, which holds the bottom parts of the bottles and when the rack is placed in the bottle-holder rests on the ways X, while stops X' enable it to be placed in the proper position each time. After the bottles are placed in the holders these are given a half-turn on their pivots, bringing the shot-receptacles above the bottles and allowing the shot to fall down into the latter.

The bottle-holders are held from rotation during the working of the machine by a finger-lever latch $g'$, which has a projection $g^2$, which engages with a notched angle-piece $g^3$, which is fastened to the bottle-holder H. The latch $g'$ has a spring $g^4$, which holds it firmly in the notch $h^2$.

Fastened to the frame D are cross-bars $a'$, which at points opposite the brackets $p$ carry ratchet-wheels $a^2$. These ratchets are worked by pawls $a^3$, carried on a bar $a^4$, which moves upward relatively to the frame D at each downward movement of said frame. This it does by striking the top of the bearing $l$, being guided in so doing by screws $b'$, provided in slots $b^2$. Its return movement is effected by the springs $b^3$. When the stop-pins $h^3$ provided to the ratchets $a^2$ come in contact with extensions $h^4$, formed on the finger-levers $g'$, the levers are unlatched and allow the parts having the shot-receptacles to pass to the under side by reason of their greater weight, so that the bottles are turned bottom upward and the shot returns to the receptacles.

The machine after being started in operation runs for a predetermined period, when it is stopped automatically by the mechanism shown in the Figs. 3 and 4 and which is constructed and operates as follows: A clutch $j$ (shown in Fig. 2) is operated by a sliding sleeve $j'$ and a lever $j^2$. This last has a connection K', by which it connects with the hand-lever $K^2$. The timing mechanism consists of an eccentric $l^2$, which oscillates a lever $m'$, which in turn operates a connecting-rod $n'$, lever $n^2$, pawl $n^3$, and ratchet $n^4$. The ratchet has on the side next the base of the machine a part $o'$, which has no teeth. This toothless part is of somewhat less diameter, but of the same width as is the toothed portion of the ratchet. This toothless portion $o'$ of said ratchet has a recess $o^2$, into which falls a projection $o^3$ of the latch-lever $o^4$, which is actuated by a spring $c^5$ when the ratchet $n'$ and recess $o^2$ have been rotated into the proper relative positions.

When the machine is started into operation by moving the hand-lever $K^2$, the stop-latch $q$ passes over and engages with $o^4$, thus holding the clutch-lever from backward movement and allowing the machine to operate until the ratchet $n'$ and recess $o^2$ have been brought to the before-mentioned position. This done, the projection $o^3$ passes into the recess $o^2$ and brings the latch $o^4$ out of contact with $q$. This allows the spring $q'$ to draw back the connection K', clutch-lever $j^2$, and sleeve $j'$, thus stopping the motion of the machine.

What I claim as my invention is—

1. In a bottle-washing machine the combination with vertical guides, springs carried by said guides, a movable frame working along said guides and resting upon said springs, and mechanism for giving a vertically-reciprocating movement to the frame, of bottle-holders carried by the frame and revoluble on horizontal axes, mechanism for retaining bottles in said holders, means for supplying liquid to the interiors of the bottles, and mechanism for at intervals turning the bottle-holders upon their said axes, substantially as herein set forth.

2. In a bottle-washing machine the combination with vertical guides, springs carried by said guides, a movable frame working along said guides and resting on said springs, bottle-holders carried by the frame and revoluble on horizontal axes, of tubular devices for receiving the mouths of the bottles, shot-receptacles which through said devices communicate with the interiors of the bottles when these are in place, springs arranged to press upon the bases of the bottles to retain them with their necks in proper relation with the tubular devices, and mechanism for giving the vertical reciprocating motion to the frame, substantially as herein set forth.

3. In a bottle-washing machine the combination with vertical guides, a vertically-movable frame working along said guides, bottle-holders carried by the frame and revoluble upon horizontal axes, of tubular devices for receiving the mouths of the bottles, shot-receptacles which through said devices communicate with the interiors of the bottles when these are in place, springs arranged to press upon the bases of the bottles to retain them with their necks in proper relation with the tubular devices, means for supplying a cleansing liquid to the bottles, and mechanism for giving the vertical reciprocating motion to the frame, substantially as herein set forth.

4. In a bottle-washing machine the combination with vertical guides, a vertically-movable frame working along said guides, bottle-holders working along said frame, and revoluble upon horizontal axes, of tubular devices constructed with concave seats for receiving the mouths of the bottles, shot-receptacles which through said devices communicate with the interiors of the bottles when they are in place, nozzles arranged in the shot-receptacles for the injection of cleaning liquids therethrough to the bottles, and mechanism for giving a reciprocating motion to the frame, substantially as herein set forth.

5. In a bottle-washing machine, the combination with a vertically-movable frame and mechanism for giving a reciprocating movement thereto, of bottle-holders revoluble on horizontal axes constructed with channeled top and bottom sections which are movable one upon the other, seats constructed to receive the mouths of the bottles, means for introducing liquids through the seats to the bottles, means for retaining the top and bottom sections when the bottles are clamped between them with the mouths of the bottles in the seats, substantially as herein set forth.

6. In a bottle-washing machine, the combination with a vertically-movable frame and mechanism for giving a reciprocating movement thereto, of bottle-holders revoluble on their horizontal axes, bottle-holding crates each constructed with channeled top and bottom sections which are movable one upon the other, seats constructed to receive the mouths of the bottles, springs arranged to bear upon the bases of the bottles, shot-receptacles arranged to communicate with the interior of the bottles when these are in place, nozzles provided in the shot-receptacles to supply through the seats a cleansing liquid to the bottles, and means for retaining the top and bottom sections in position when the bottles are clamped in the holder, substantially as herein set forth.

7. In a bottle-washing machine the combination with a vertically-movable frame, mechanism which comprises a driving-shaft, a clutch, and a clutch-pulley, for reciprocating the frame, holders carried by the frame, of mechanism for automatically disengaging the clutch-pulley to stop the movement of the frame at predetermined periods, substantially as herein set forth.

8. In a bottle-washing machine the combination with a vertically-movable frame, mechanism for giving a reciprocating movement to said frame, bottle-holders carried by the frame and revoluble on their horizontal axes, and mechanism which includes a driving-shaft, a clutch, and clutch-pulley, of a recessed disk, a latch-lever which has a lug arranged to fall into the recess of the disk, a clutch, means for actuating the latch-lever, a stop-latch connected with the clutch-lever and mechanism for withdrawing the clutch-lever when released by the latch-lever, substantially as herein set forth.

9. In a bottle-washing machine the combination with a vertically-movable frame, and revoluble bottle-holders carried thereby, of a driving-shaft and clutch-pulley, a cam on said shaft, a pawl, a ratchet having a recessed hub, devices for operating the ratchet and pawl from the cam, a latch-lever which has a lug which coöperates with the recess of the ratchet-hub, a clutch-lever, a rod connected to the clutch-lever and having a stop-latch which engages with the latch-lever and a hand-lever upon the connecting-rod, substantially as herein set forth.

10. In a bottle-washing machine, the combination with a vertically-movable frame, mechanism for giving a reciprocating movement to said frame, and bottle-holders carried by the frame revoluble on their horizontal axes, and composed each of two channel-shaped parts movable one upon the other with the one part constructed with beveled seats to receive the mouths of the bottles, and the other provided with fingers to act upon the bases of the bottles, of a slotted cam having a suitable handle, a cam-roll arranged to move in the cam-slot of the cam and a spring arranged to press upon one part of the holder toward the other, substantially as herein set forth.

11. In a bottle-washing machine, the combination with a vertically-movable frame and mechanism for giving a reciprocating movement thereto, of bottle-holders, bottle-holding crates each revoluble on a horizontal axis, of finger-levers on the bottle-holders arranged to engage with stops on the crates, substantially as herein set forth.

12. In a bottle-washing machine, the combination with a vertically-movable frame and mechanism for giving a reciprocating movement thereto, of bottle-holders revoluble on horizontal axes, bottle-holding crates carried by said revoluble holders, stops provided to said crates, finger-levers carried by the bottle-holders and arranged to engage with the stops, ratchets mounted on the holders and provided with stops arranged to periodically withdraw the finger-levers from the stops on the crates, and mechanism for operating the ratchet from the revoluble movements of the bottle-holders, substantially as herein set forth.

ANDREW PERTHOLD.

Witnesses:
  FRED NIERCKE,
  JOHN GEISZLER.